(12) United States Patent
Surnilla et al.

(10) Patent No.: US 6,553,757 B1
(45) Date of Patent: Apr. 29, 2003

(54) NOX PURGE AIR/FUEL RATIO SELECTION

(75) Inventors: Gopichandra Surnilla, West Bloomfield, MI (US); Grant Alan Ingram, West Lafayette, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/992,257

(22) Filed: Nov. 19, 2001

(51) Int. Cl.[7] ................................................. F01N 3/00
(52) U.S. Cl. ............................. 60/285; 60/274; 60/276
(58) Field of Search .......................... 60/274, 276, 285, 60/286, 297, 301, 311

(56) References Cited

U.S. PATENT DOCUMENTS

| | | | |
|---|---|---|---|
| 5,343,702 A | * 9/1994 | Miyajima et al. | 60/285 |
| 5,450,722 A |   9/1995 | Takeshima et al. | |
| 5,473,890 A | * 12/1995 | Takeshima et al. | 60/285 |
| 5,501,074 A | * 3/1996 | Suetsugu et al. | 60/285 |
| 5,517,820 A | * 5/1996 | Kuroda et al. | 60/274 |
| 5,778,666 A |   7/1998 | Cullen et al. | |
| 5,934,072 A | * 8/1999 | Hirota et al. | 60/301 |
| 5,943,857 A | * 8/1999 | Ansell et al. | 60/274 |
| 5,974,788 A | * 11/1999 | Hepburn et al. | 60/274 |
| 6,129,898 A |   10/2000 | Watkins et al. | |
| 6,237,326 B1 | * 5/2001 | Russell | 60/274 |
| 6,244,047 B1 |   6/2001 | Brehob et al. | |
| 6,269,634 B1 | * 8/2001 | Yokota et al. | 60/286 |
| 6,370,870 B1 | * 4/2002 | Kamijo et al. | 60/286 |
| 6,378,297 B1 | * 4/2002 | Ito et al. | 60/286 |

* cited by examiner

*Primary Examiner*—Thomas Denion
*Assistant Examiner*—Tu M. Nguyen
(74) *Attorney, Agent, or Firm*—Julia Voutyras; Allan J. Lippa

(57) ABSTRACT

A method for improving a purge conversion efficiency of a Lean NOx Trap coupled downstream of a lean-burn internal combustion engine is presented. This method proposes adjusting the purge air-fuel ratio of the device based on its temperature. According to the proposed method, a less rich air-fuel ratio is provided at lower operating temperatures to reduce hydrocarbon emissions since within this temperature range air-fuel ratio does not have a significant affect on NOx emissions. At mid-range operating temperatures, the air-fuel ratio is gradually decreased (made more rich) to reduce NOx emissions. And, finally, at high operating temperatures, HC and NOx emissions are reduced, and therefore, the purge air-fuel is kept at a constant more rich value. This method improves emission control and fuel economy during purge.

16 Claims, 3 Drawing Sheets

NOX PURGE AIR/FUEL RATIO SELECTION

FIELD OF THE INVENTION

The present invention relates to a system and a method for controlling the air-fuel ratio in an internal combustion engine, and more particularly, to controlling the air-fuel ratio such that NOx and hydrocarbon emissions are reduced.

BACKGROUND OF THE INVENTION

Internal combustion engines are typically coupled to an emission control device known as a three-way catalytic converter (TWC) designed to reduce combustion by-products such as carbon monoxide (CO), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap (LNT), is usually coupled downstream of an upstream three-way catalyst. The LNT, like the upstream TWC, stores exhaust gas constituents such as, for example, nitrogen oxides, NOx, when the engine is operating at a lean air-fuel ratio, and reduces (purges) them when the engine is operating at a rich or stoichiometric air-fuel ratio.

Because continued lean operation will ultimately saturate the LNT with NOx, the prior art teaches periodically varying the air-fuel ratio from a nominally lean setting to a rich setting, during which stored NOx are released from the LNT and reduced by the available hydrocarbons and carbon monoxide in the enriched operating condition. However, during the purge, some of the exhaust gas constituents, such as NOx and HC are not reduced, and are emitted into the atmosphere.

The inventors herein have recognized that the amount of NOx and HC released during a purge is a function of the temperature of the LNT and the air-fuel ratio of the purge mixture. In other words, the inventors have recognized that when the LNT operating at lower temperatures, the purge air-fuel ratio has little effect on NOx emissions, however, HC emissions increase with richer purge air-fuel ratios. Further, the inventors herein have recognized that at higher LNT operating temperatures, NOx emissions reduce with richer purge air-fuel ratios, while HC emissions increase.

SUMMARY OF THE INVENTION

In solving the above problem, a system and a method are provided for decreasing emissions of exhaust gas constituents by selecting an optimum purge air-fuel ratio based on the operating temperature of the exhaust gas aftertreatment device.

In carrying out the above solution, features and advantages of the present invention, a system and a method for improving a conversion efficiency of an exhaust gas aftertreatment device coupled downstream of a lean-burn internal combustion engine during a NOx purge, include: providing a base rich air-fuel ratio of an exhaust gas mixture entering the device; adjusting said base air-fuel ratio so as to increase a first exhaust gas mixture component conversion efficiency when the device is in a first operating temperature range; and adjusting said base air-fuel ratio so as to increase a second exhaust gas mixture component conversion efficiency when the device is in a second operating temperature range.

An advantage of the present invention is improved emission control, due to the fact that selecting the most appropriate air-fuel ratio based on the temperature of the LNT reduces NOx and HC emissions during purge.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such a s conventional engines in addition to direct injection stratified charge (DISC) or direct injection spark ignition engines (DISI).

Figure 1:
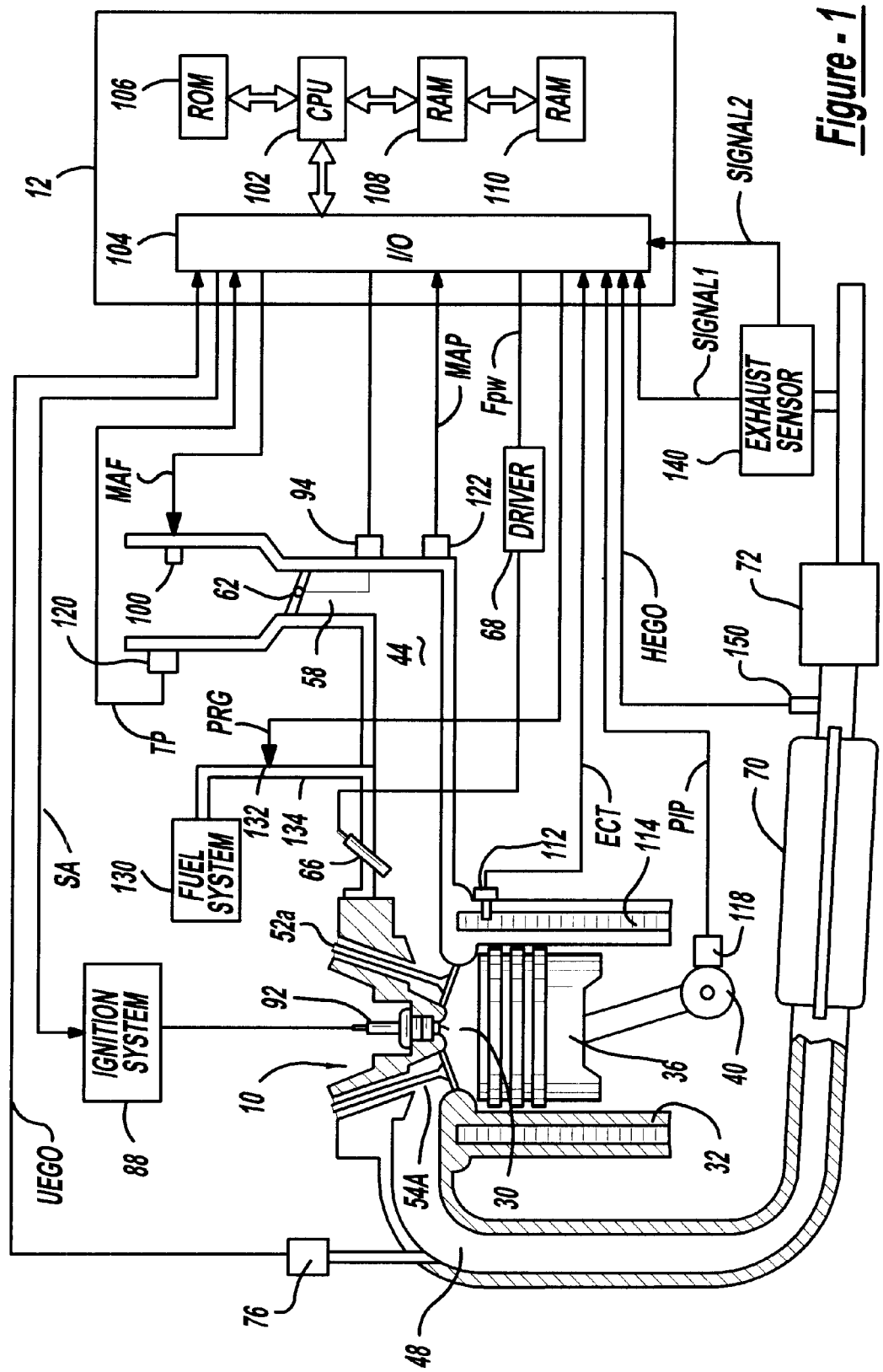
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In this particular example, the piston 36 includes a recess or bowl (not shown) for forming stratified charges of air and fuel. In addition, the combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio. Further, signal HEGO is provided by sensor 150 coupled to the exhaust between devices 70 and 72.

Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases.

Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures.

In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx trap 72 is shown positioned downstream of catalytic converter 70. Both devices store exhaust gas components, such as NOx, when engine 10 is operating lean of stoichiometry. These are subsequently reacted with HC and other reductant and are catalyzed during a purge cycle when controller 12 causes engine 10 to operate in either a rich mode or a near stoichiometric mode. Additionally, the LNT has a temperature sensor (not shown) located at mid-bed providing a signal to controller 12. Alternatively, the LNT temperature can be estimated from engine operating conditions, such as engine speed, load, air-fuel ratio, etc.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel system 130 is coupe to intake manifold 44 via tube 134. Fuel vapors (not shown) generated in fuel system 130 pass through tube 134 and are controlled via purge valve 132. Purge valve 132 receives control signal PRO from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2:
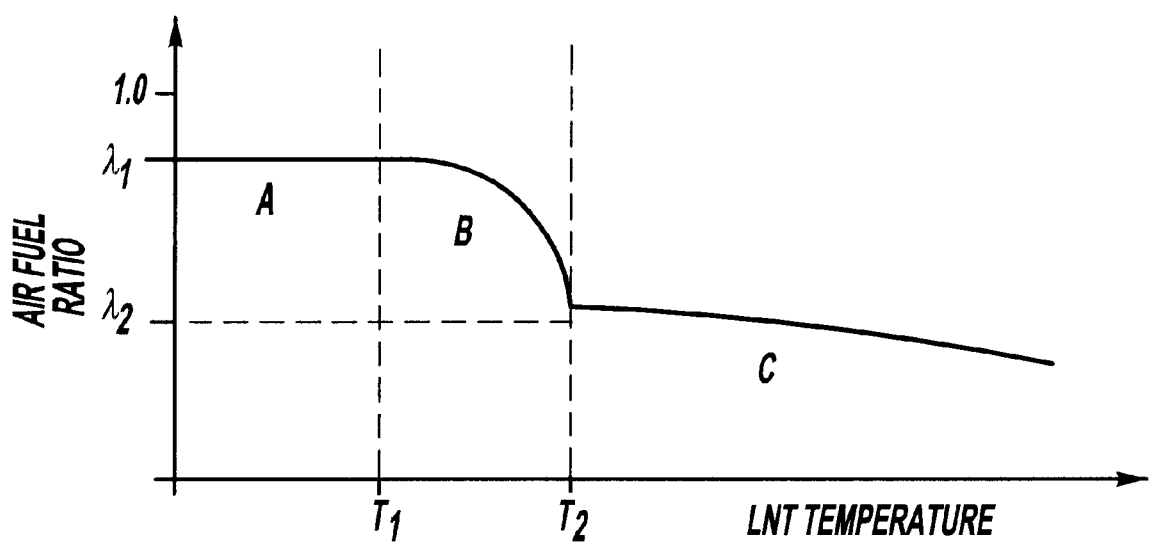
FIG. 2 is a graph of the purge air-fuel ratio vs. LNT temperature in accordance with the present invention.

FIG. 2 is a plot of an example of a purge air-fuel ratio vs. LNT temperature in accordance with the present invention. As can be seen, in Region A, when the LNT temperature is below $T_1$ a less rich air-fuel ratio $\lambda_1$ is used. This is done because in this lower temperature range, HC emissions are strongly dependent on the purge air-fuel ratio, while NOx emissions are not significantly affected by these changes. In other words, purging with a less rich air fuel ratio at lower LNT temperatures significantly reduces HC emissions without affecting NOx emissions.

At LNT temperatures greater than $T_1$, as shown in Region B, the LNT is purged at progressively richer air-fuel ratios, changing as a function of the LNT temperature and reaching a minimum value $\lambda_2$ (region C) at $T_2$.

At very high temperatures, such as those above $T_2$, when both the LNT NOx conversion efficiency and HC conversion efficiency are high, the purge air-fuel ratio is kept at the minimum (richest). Alternatively, the purge air-fuel ratio can be slowly ramped back to $\lambda_1$ in order to improve fuel economy.

Figure 3:
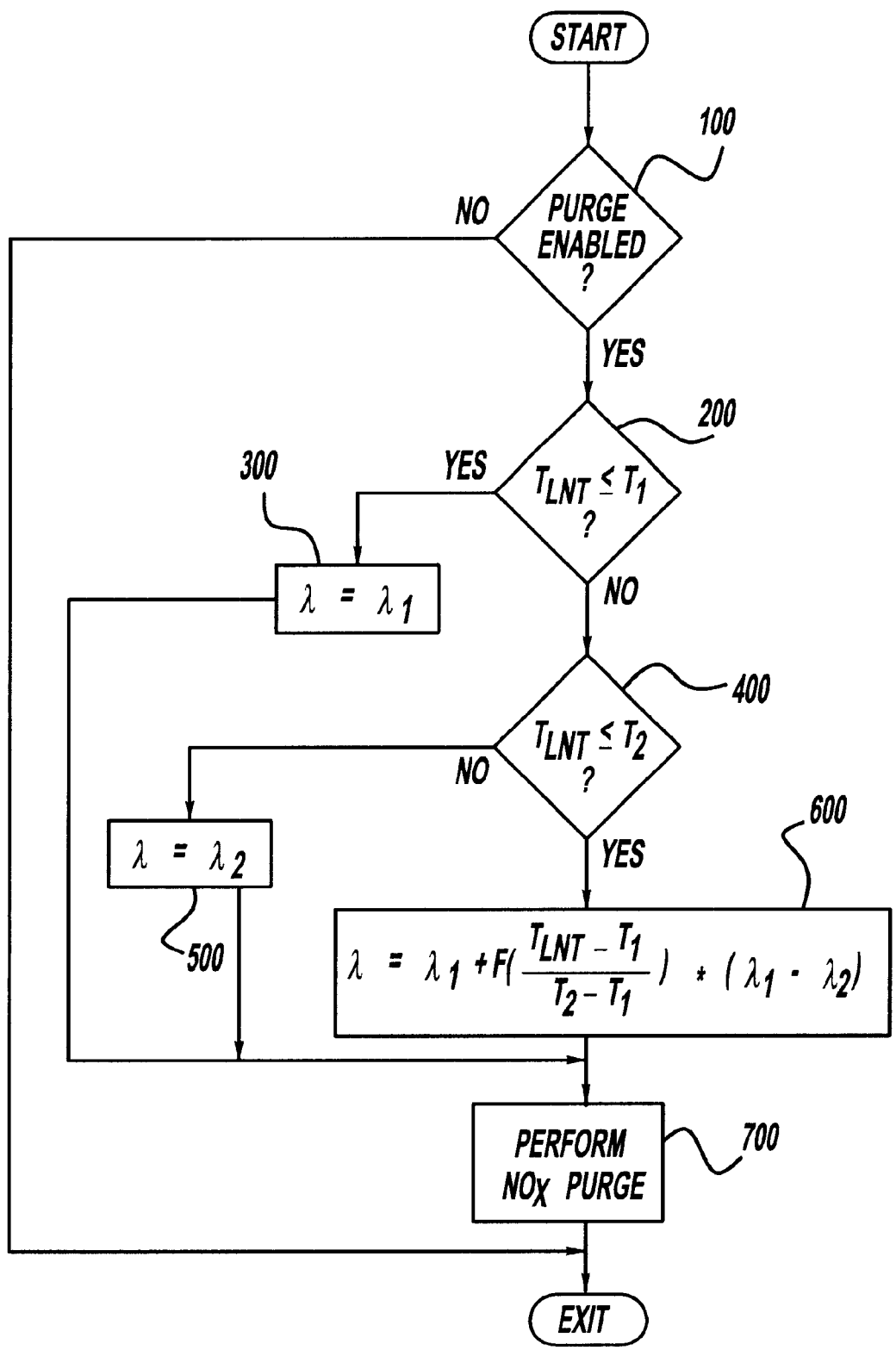
FIG. 3 is a block diagram of the embodiment in which the invention is used to advantage.

The diagram in FIG. 3 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description.

Although not explicitly illustrated, one of ordinary skill in the art will recognize that one or more of the illustrated steps or functions may be repeatedly performed depending on the particular strategy being used.

Referring now to FIG. 3, first, in step 100 a determination is made whether a NOx purge should be performed. If the answer to step 100 is NO, the routine exits. If the answer to step 100 is YES, the routine proceeds to step 200 wherein a determination is made whether the LNT temperature is below $T_1$, which in this example is approximately 350 deg. C. If the answer to step 200 is YES, i.e., the LNT is in the lower operating temperature range, the purge air fuel ratio is set at $\lambda_1$ (0.9 in this example) in step 300, and the routine proceeds to step 700 wherein a NOx purge is performed. If the answer to step 200 is NO, the routine proceeds to step 400 wherein a determination is made whether the LNT temperature is below $T_2$, which in this example is approximately 450 deg. C. If the answer to step 400 is YES, the routine proceeds to step 600, wherein the purge air-fuel ratio is calculated according to the following equation:

$$\lambda = \lambda_1 + f\left(\frac{T_{\text{Int}} - T_1}{T_2 - T_1}\right) \cdot (\lambda_1 - \lambda_2),$$

wherein the term $$f\left(\frac{T_{\text{Int}} - T_1}{T_2 - T_1}\right)$$

is an adjustment value determined from a first prestored table as a function of the LNT temperature. The routine then proceeds to step 700 wherein a purge is performed, and exits. If the answer to step 400 is NO, the routine proceeds to step 500 wherein the purge air-fuel ratio is set to $\lambda_2$, (0.7 in this example) and the routine proceeds to step 700, and the routine then exits. Alternatively, the purge air-fuel ratio can be ramped up to $\lambda_1$ by using an adjustment value determined from a second pre-stored table as a function of the LNT temperature. In other words, depending on the LNT temperature, the adjustment value is determined from either a first or a second pre-stored table.

Therefore, according to the present invention, it is possible to minimize NOx and HC emissions during an LNT purge by dynamically controlling the purge air-fuel ratio based on the temperature of the LNT.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A system for reducing emissions in a lean-burn internal combustion engine, the system comprising:

an exhaust gas aftertreatment device coupled downstream of an internal combustion engine; and a controller adjusting an air-fuel ratio of an exhaust gas mixture entering the device such that an amount of a first exhaust gas component in an exhaust gas mixture exiting the device is reduced when said device is within a first operating temperature range, said controller further adjusting said air-fuel ratio such that an amount of a second exhaust gas component exiting the device is reduced when said device is within a second operating temperature range, wherein said fist exhaust gas component is hydrocarbon.

2. The system as set forth in claim 1 wherein said second exhaust gas component is NOx.

3. The system as set forth in claim 1 wherein said device is a Lean NOx Trap.

4. A method for improving a conversion efficiency of an exhaust gas aftertreatment device coupled downstream of a lean-burn internal combustion engine during a NOx purge, the method comprising:

providing a base rich air-fuel ratio of an exhaust gas mixture entering the device;

adjusting said base air-fuel ratio so as to increase a first exhaust gas mixture component conversion efficiency when the device is in a first operating temperature range, wherein said first exhaust gas mixture component is hydrocarbon; and adjusting said base air-fuel ratio so as to increase a second exhaust gas mixture component conversion efficiency when the device is in a second operating temperature range.

5. The method as set forth in claim 4 wherein the exhaust gas aftertreatment device is a lean NOx trap.

6. The method as cited in claim 4 wherein said second exhaust gas mixture component is NOx.

7. The method as set forth in claim 4 wherein said adjusting said base air-fuel ratio so as to increase a first exhaust gas mixture component conversion efficiency when the device is in a first operating temperature range comprises decreasing an overall air-fuel ratio of said exhaust gas mixture.

8. The method as set forth in claim 4 wherein said adjusting said base air-fuel ratio so as to increase a second exhaust gas mixture component conversion efficiency when the device is in a second operating temperature range comprises an overall air-fuel ratio of said exhaust gas mixture.

9. A method for improving a conversion efficiency of an exhaust gas aftertreatment device coupled downstream of an internal combustion engine during a NOx purge, the method comprising:

determining whether a rich purge cycle should be performed to release stored NOx; and during said purge:

calculating an air-fuel ratio of a rich exhaust gas mixture entering the device as a first function of a device temperature when said temperature is below a predetermined threshold; and calculating said rich air-fuel ratio as a second function of said device temperature, when said temperature is above said predetermined threshold, wherein said calculated rich air-fuel ratio is richer when said temperature is below said threshold than when said temperature is above said threshold.

10. The method as set forth in claim 9 wherein the exhaust gas aftertreatrnent device is a lean NOx trap.

11. A method for improving a conversion efficiency of an exhaust gas aftertreatment device coupled downstream of an internal combustion engine during a NOx purge, the method comprising:

determining whether a rich purge cycle should be performed to release stored NOx; and during said purge:

providing a base rich air-fuel ratio for an exhaust gas mixture entering the device;

calculating a first adjustment value for said base air-fuel ratio as a first function of a device temperature when said temperature is within a first operating range; and calculating a second adjustment value for said base air-fuel ratio when said temperature is within a second operating range, where said second temperature operating range is higher than said first temperature operating range, wherein said first adjustment value produces a first rich air-fuel ratio that is richer than a second rich air-fuel ratio produced by said second adjustment.

12. The method as cited in claim 11 wherein said device is a Lean NOx Trap.

13. The method as cited in claim 12 wherein said base air-fuel ratio of the exhaust mixture is provided when the device temperature is below a lower threshold of said first operating range.

14. The method as cited in claim 11 further comprising calculating a third adjustment value for said base air-fuel ratio when said temperature is between said first and second operating ranges, and wherein said third adjustment produces a rich air-fuel ratio between said first and second air-fuel ratios, wherein said rich air-fuel ratio varies between said first and second air-fuel ratios.

15. The method cited in claim 12 further comprising adjusting said base air-fuel ratio based on said first adjustment value when said temperature is within said first operating range.

16. The method as cited in claim 15 further comprising adjusting said base air fuel ratio based on said second adjustment value when said temperature is within a second operating range.

* * * * *